United States Patent
Dudekula et al.

(10) Patent No.: US 10,665,130 B1
(45) Date of Patent: May 26, 2020

(54) IMPLEMENTING COGNITIVELY GUIDING VISUALLY IMPAIR USERS USING 5TH GENERATION (5G) NETWORK

(71) Applicant: International Business Machines Corporation, Armonk, NY (US)

(72) Inventors: Rizwan Dudekula, Bangalore (IN); Kushal Patel, Pune (IN); Gandhi Sivakumar, Bentleigh (AU); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/201,042

(22) Filed: Nov. 27, 2018

(51) Int. Cl.
 G09B 21/00 (2006.01)
 H04W 4/024 (2018.01)
 G08G 1/005 (2006.01)
(52) U.S. Cl.
 CPC .......... *G09B 21/006* (2013.01); *G08G 1/005* (2013.01); *H04W 4/024* (2018.02)
(58) Field of Classification Search
 None
 See application file for complete search history.

(56) References Cited

U.S. PATENT DOCUMENTS

| | | | |
|---|---|---|---|
| 2015/0063610 A1 | 3/2015 | Mossner | |
| 2016/0171883 A1* | 6/2016 | Kvetny | G09B 21/007 340/944 |
| 2017/0252256 A1 | 9/2017 | Henshue et al. | |
| 2017/0270827 A1* | 9/2017 | Channabasappa | A43B 3/0005 |
| 2017/0345338 A1* | 11/2017 | Roark | G09B 21/007 |

OTHER PUBLICATIONS

Vignesih, M, et al., Object Detection Application for Visually Challenged People Using Internet of Things, International Journal for Research in Engineering Application & Management, vol. 02, Issue 12, Mar. 2017.

* cited by examiner

*Primary Examiner* — John F Mortell
(74) *Attorney, Agent, or Firm* — Donald J. O'Brien

(57) ABSTRACT

A method, system and computer program product are provided for implementing enhanced cognitively guiding visually impaired users. A 5G enabled guide for visually impaired (5G EGFVI) apparatus is provided to implement enhanced cognitively guiding visually impaired users. The 5G EGFVI apparatus provides an appropriate map for the visually impaired based on Internet of Things (IoT) enabled signals. An optimal path is provided by identifying IoT enabled traffic signals.

20 Claims, 6 Drawing Sheets

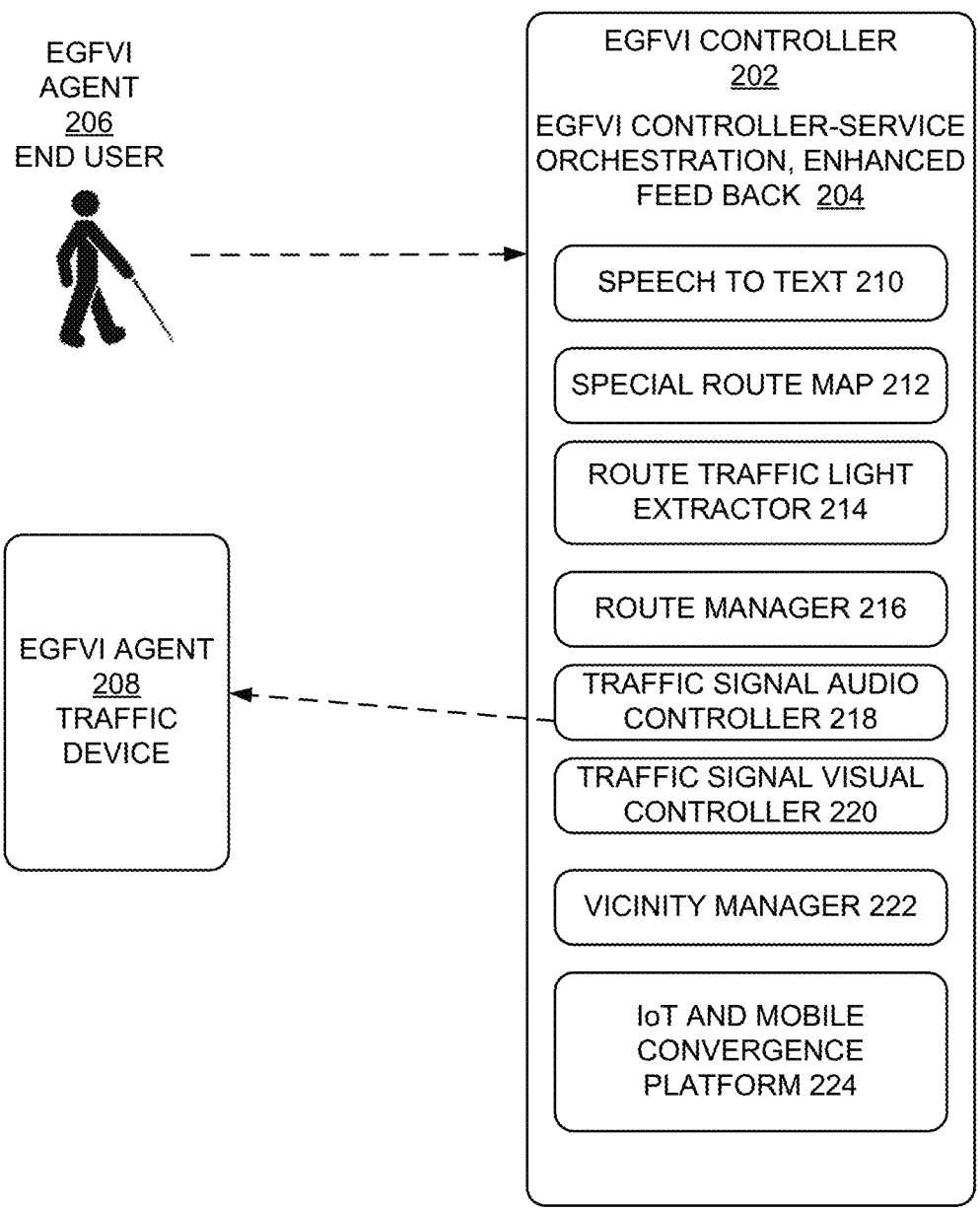

ical mobile communications or 5th generation wireless systems and should be understood to broadly include other existing and future cellular mobile communications and wireless systems enabling high data rate, large system capacity, and large device connectivity.

IMPLEMENTING COGNITIVELY GUIDING VISUALLY IMPAIR USERS USING 5TH GENERATION (5G) NETWORK

FIELD OF THE INVENTION

The present invention relates generally to the data processing field, and more particularly, relates to a method, system and computer program product for implementing enhanced cognitively guiding visually impaired users with a 5G network using IoT.

DESCRIPTION OF THE RELATED ART

Visually impaired users experience challenges in today's day-to-day changing world. In developed countries there are guiding mechanism in traffic signals through audio-based signs for the visually challenged person. In developing countries no mechanism exists to guide the visually impaired.

A need exists to provide enhanced communications and guiding mechanisms to implement enhanced cognitively guiding visually impaired users and enable the visually impaired to be more independent.

As used in the following description and claims, the term "5G network" is not limited to 5th generation cellular mobile communications or 5th generation wireless systems and should be understood to broadly include other existing and future cellular mobile communications and wireless systems enabling high data rate, large system capacity, and large device connectivity.

SUMMARY OF THE INVENTION

Principal aspects of the present invention are to provide a method, system and computer program product for implementing enhanced cognitively guiding visually impaired users, for example in 5G network using IoT. Other important aspects of the present invention are to provide such method, system and computer program product substantially without negative effects and that overcome many of the disadvantages of prior art arrangements.

In brief, a method, system and computer program product are provided for implementing enhanced cognitively guiding visually impaired users. A 5G enabled guide for visually impaired (5G EGFVI) apparatus is provided to implement enhanced cognitively guiding visually impaired users. The 5G EGFVI apparatus provides an appropriate map for the visually impaired based on Internet of Things (IoT) enabled signals. An optimal path is provided by identifying IoT enabled traffic signals.

In accordance with features of the invention, the 5G EGFVI apparatus includes an EGFVI agent and an EGFVI controller. The agent resides with an end user device and a traffic light.

In accordance with features of the invention, a special route map component of the EGFVI controller enables the end user to select the routes.

In accordance with features of the invention, a route traffic light extractor of the EGFVI controller computes IoT capable lights at audio/visual capability level in the route.

In accordance with features of the invention, a route manager of the EGFVI controller senses the start of the journey along with the direction and triggers control of an identified traffic light.

In accordance with features of the invention, an EGFVI agent with the traffic signal provides audio specialized for visually challenged on a trigger.

In accordance with features of the invention, an EGFVI agent with the traffic signal provides a special vision or representation of traffic lights such as a red color.

In accordance with features of the invention, a vicinity manager of the EGFVI controller uses available location-based platforms to identify nearby mobiles devices in the traffic, such as based on platforms served by current e-Node Base station or nearby ones and triggers notification alerts until the visually impaired person crosses the road.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 illustrates an example EGFVI apparatus including EGFVI agents and an EGFVI controller to implement enhanced cognitively guiding visually impaired users with the computer system of FIG. 1 in accordance with preferred embodiments;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

The terminology used herein is for the purpose of describing embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system are provided for implementing enhanced cognitively guiding visually impaired users including a 5G enabled guide for visually impaired (5G EGFVI) apparatus with Internet of Things (IoT) enabled signals. 5G includes 5th generation wireless systems or 5th generation of cellular mobile communications, and other cellular mobile communications and wireless systems enabling high data rate, large system capacity, and large device connectivity.

In accordance with features of the invention, the 5G enabled guide for visually impaired (5G EGFVI) apparatus is provided to implement enhanced cognitively guiding visually impaired users. The 5G EGFVI apparatus of the invention enables enhanced implementation of appropriate map for the visually impaired based on Internet of Things (IoT) enabled signals. Visually impaired users with a 5G EGFVI agent advantageously are provided a selected route based on special needs. The 5G EGFVI apparatus of the invention provides an optimal path, identifying IoT enabled traffic signals.

Figure 1:
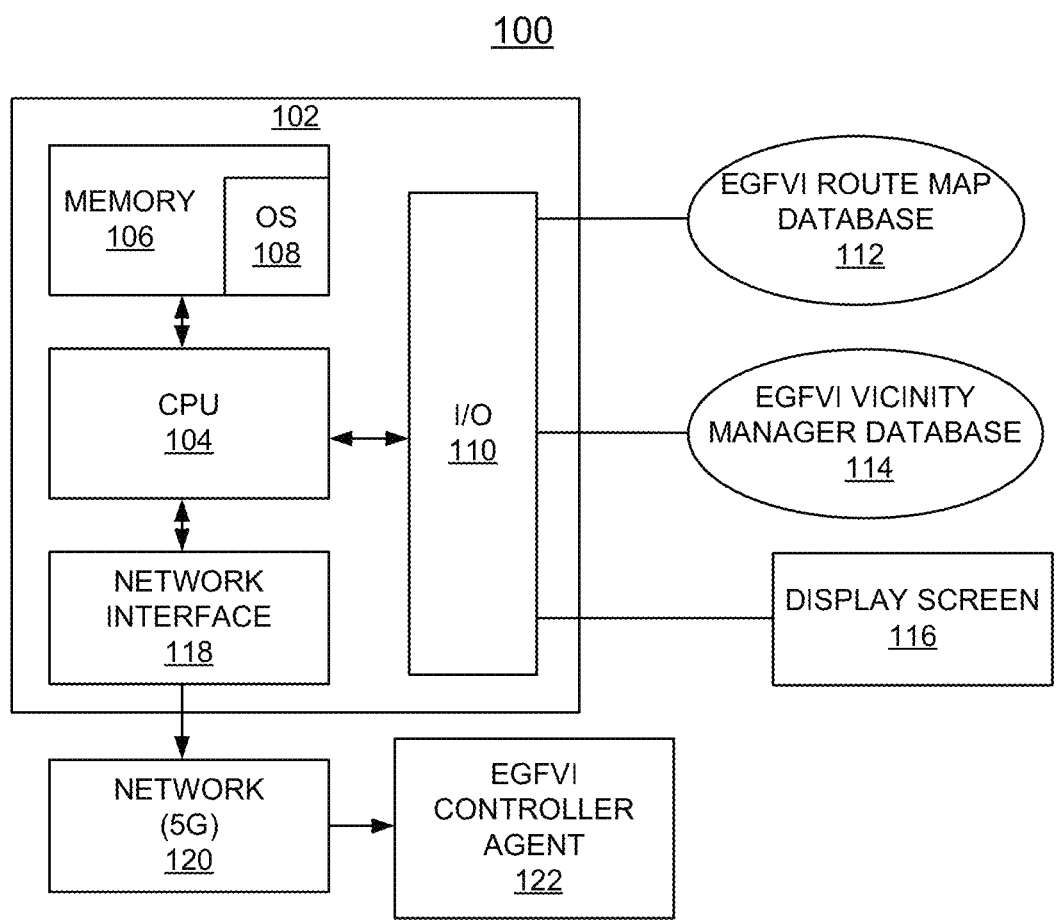
FIG. 1 is a block diagram of an example computer system for implementing enhanced cognitively guiding visually impaired users in accordance with preferred embodiments.

Having reference now to the drawings, in FIG. 1, there is shown an example computer system embodying the present invention generally designated by the reference character 100 for implementing enhanced cognitively guiding visually impaired users in accordance with preferred embodiments. Computer system 100 includes a processor system 102 including one or more processors 104 or general-purpose programmable central processing units (CPUs) 104. As shown, computer system 100 includes a single CPU 104; however, system 100 can include multiple processors 104 typical of a relatively large system.

Computer system 100 includes a system memory 106 including an operating system 108. System memory 106 is a random-access semiconductor memory for storing data, including programs. System memory 106 is comprised of, for example, a dynamic random-access memory (DRAM), a synchronous direct random-access memory (SDRAM), a current double data rate (DDRx) SDRAM, non-volatile memory, optical storage, and other storage devices.

Computer system 100 includes an I/O interface 110 for transferring data to and from I/O system components including a 5G enabled guide for visually impaired (5G EGFVI) route map database 112, an EGFVI vicinity manager database 114, and a display screen 116. The EGFVI route map database 112 includes a physical layout for generating route maps for the EGFVI service with identified IoT enabled traffic lights. The EGFVI vicinity manager database 114 includes, for example, a library of different existing location-based platforms used by a vicinity manager of the EGFVI apparatus, for example to identify nearby mobiles devices in the traffic area, such as based on the ones served by current e-Node Base station or nearby ones used to trigger notification alerts through identified in scope traffic lights and trigger through location tracking mechanisms until a visually impaired person crosses the road.

As shown in FIG. 1, computer system 100 includes a network interface 118 coupled to a network 120 including a 5G network which is connected to an 5G enabled guide for visually impaired (5G EGFVI) controller and agent 122.

Referring also to FIG. 2, there is shown an example 5G enabled guide for visually impaired (5G EGFVI) apparatus generally designated by the reference character 200 used with the computer system 100. The 5G EGFVI apparatus 200 situated in a service orchestration layer of the 5G network, includes an EGFVI controller 202 used with an EGFVI agent 206 provided with an end user, and an EGFVI agent 208 provided with a traffic device. The 5G EGFVI apparatus 200 situated in a service orchestration layer optionally is offered as-a-service model to 5G users subscribed.

In accordance with features of the invention, the EGFVI controller 202 and the EGFVI agents 206, 208 benefit the visually impaired community as follows. The 5G EGFVI apparatus 200 enables the visually challenged person to be more independent and helps the visually challenged person to make decisions faster. The 5G EGFVI apparatus 200 helps to reduce number of accidents and helps our visually challenged friends to live life as a non-challenged person.

In accordance with features of the invention, the EGFVI apparatus 200 identifies the start of a journey and track the direction of movement by integrating with a special device of the visually impaired, such as a mobile device or guiding stick which is IoT enabled. The EGFVI apparatus 200 specifies no IoT controlled traffic lights in a portion of the path and can prompt the user to make alternate manual arrangements in that stretch. The EGFVI apparatus 200 identifies a nearby traffic light and trigger special signs to enable the visually impaired person decide to cross the road. The EGFVI apparatus 200 identifies intermediary traffic lights which are not applicable in a selected path and brands them as not in scope. The EGFVI apparatus 200 identifies in scope traffic lights that are triggered through location tracking mechanisms. The EGFVI apparatus 200 identifies directions of movement and in scope traffic lights and uses the directions of movement and in scope traffic lights when a person travels back on the reverse route. The EGFVI apparatus 200 confirms with the visually impaired user to close the trip once done.

The EGFVI controller 202 includes a service orchestration function with enhanced feedback 204 in accordance with preferred embodiments. The EGFVI controller 202 includes a speech to text function 210 for receiving spoken input. The EGFVI controller 202 includes a special route map component, which enables the end user to select routes. The special route map component 212 provides the ability to define a route start and end through available interfaces in a route map with such route map specialized for visually challenged. The EGFVI controller 202 includes a route traffic light extractor component 214 that computes IoT capable lights at audio/visual capability level in the route. The EGFVI controller 202 includes a route manager 216 that senses the start of the journey along with the direction and triggers the control of each identified traffic light, notifying the 5G EGFVI controller 202 with the identified IoT enabled traffic lights across the path together with an estimated time of requested trigger along with an ID number of the requested visually impaired person. A traffic signal audio controller component 218 kicks off an audio specialized for visually challenged based on a trigger. A traffic signal visual controller component 220 kicks off a special vision or representation of traffic lights, such as the red color. A vicinity manager component 222 uses existing location-based platforms to identify nearby mobiles devices in the traffic route, for example, based on the ones served by a current e-Node Base station or nearby ones and triggers notification alerts until the visually impaired person crosses the road. The EGFVI controller 202 provides an IoT and mobile convergence platform 224 in accordance with preferred embodiments.

Figure 3A:
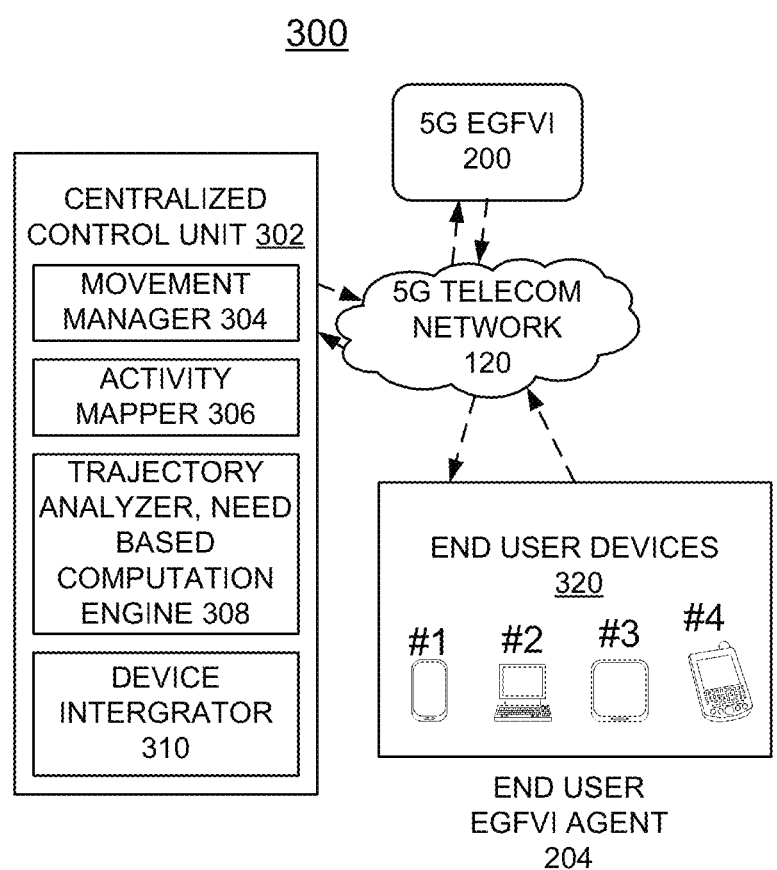
FIG. 3A illustrates an example EGFVI apparatus with example system operational functions to implement enhanced cognitively guiding visually impaired users in accordance with preferred embodiments.

Referring also to FIG. 3A, there are shown an example EGFVI apparatus generally designated by the reference character 300 with example EGFVI system operational functions to implement enhanced cognitively guiding visually impaired users in accordance with preferred embodiments. EGFVI apparatus 300 include 5G EGFVI apparatus 200 coupled by a 5G network 120 to an end user EGFVI agent 204, with end user devices 320 optionally including, for example, an IoT stick #1, a computer device #2, a haptics display #3, and a mobile phone #4. As shown, EGFVI system operational functions of a centralized control unit 302 include a movement manager 304, an activity mapper 306, a trajectory analyzed, need based computational engine 308, and a device integrator 310. An efficient route for visually impaired user is provided using the EGFVI apparatus 300, for example as shown in the example EGFVI operational steps of FIG. 3B.

Figure 3B:
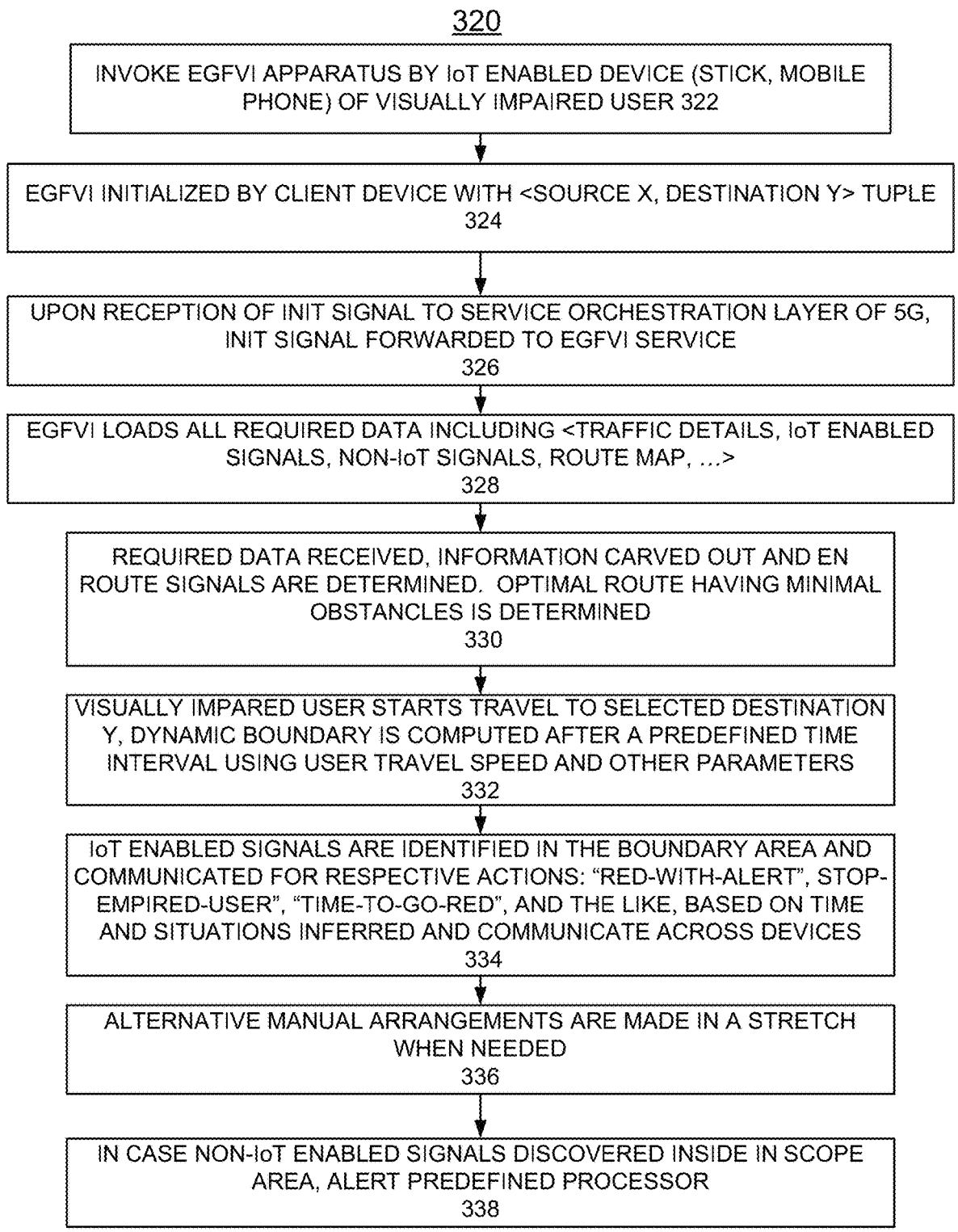
FIG. 3B is a flowchart illustrating an example EGFVI operations to implement enhanced cognitively guiding visually impaired users in accordance with preferred embodiments.

Referring to FIG. 3B, there is shown a flowchart illustrating an example EGFVI operational steps generally designated by the reference character 320 to implement enhanced cognitively guiding visually impaired users in accordance with preferred embodiments. As indicated at a block 322, EGFVI apparatus is invoked via an IoT enabled stick or Mobile phone of visually impaired user wanting to go from X to Y. As indicated at a block 324, EGFVI initialized by the client device with the information as <source X, destination Y> tuple. As indicated at a block 326, service orchestration layer of 5G receives INIT SIGNAL and forwards INIT SIGNAL to EGFVI service. As indicated at a block 328, EGFVI loads all the required data including <traffic details, IoT enabled signals, non-IoT signals, route map, . . . >. As indicated at a block 330, upon reception of the data, the information is carved out and en-route signals are determined, and optimal route having minimal obstacles is determined. As indicated at a block 332, user starts the travel to selected destination Y, the dynamic boundary is computed after a pre-defined time interval using user travel speed and other parameters. As indicated at a block 334, IoT enabled signals are identified in the boundary area and communicated for the respective actions "Red-with-alert", "Stop-user", "time-to-go-red", and the like, based on time and situations inferred and communicate across the devices. As indicated at a block 336, alternate manual arrangements are made in a stretch when needed. As indicated at a block 338, in case non-IoT enabled signals discovered in scope area, alert using predefined processor.

Figure 4:
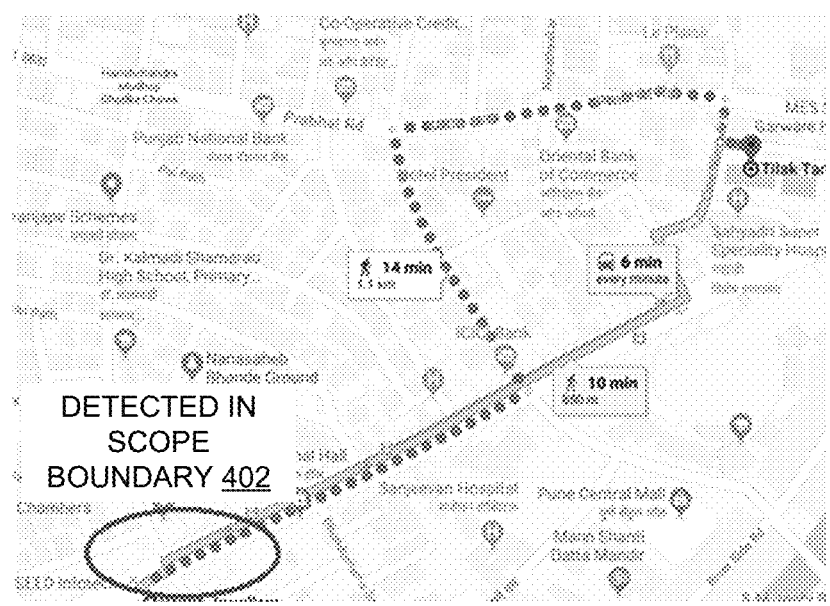
FIG. 4 is route map rendering illustrating an example generated route in accordance with preferred embodiments.

Referring to FIG. 4, there is shown an example route map rendering generally designated by the reference character 400 illustrating an example detected in scope boundary 402 in accordance with preferred embodiments.

Figure 5:
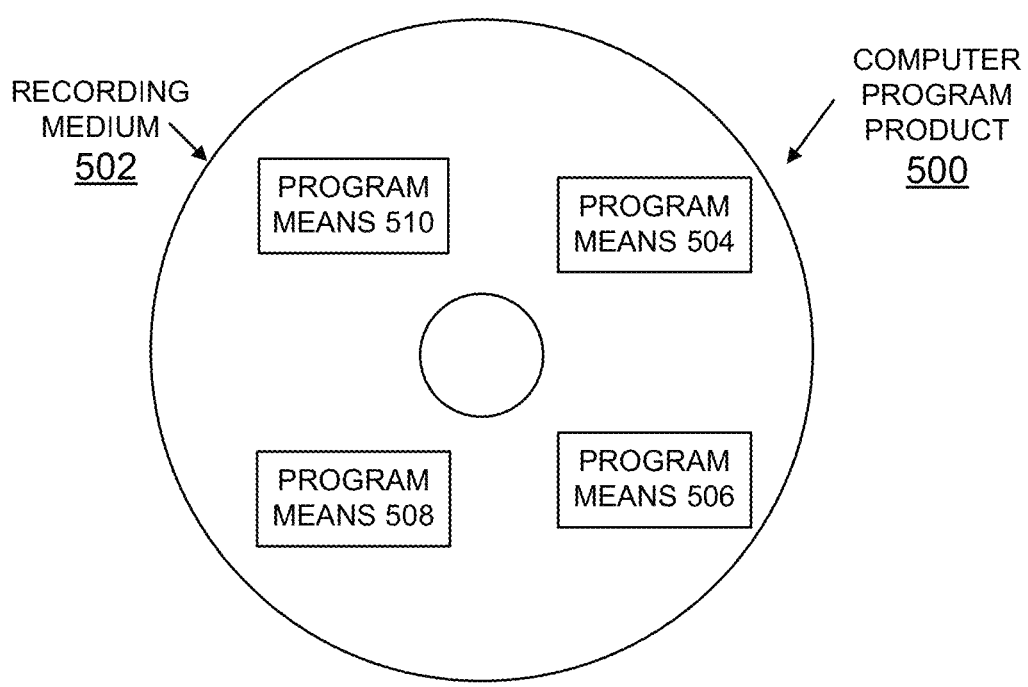
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. The computer readable storage medium 502, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 502 stores program means or instructions 504, 506, 508, and 510 on the non-transitory computer readable storage medium 502 for carrying out the methods for implementing enhanced cognitively guiding visually impaired users in the system 100 of FIG. 1 and EGFVI apparatus 200 of FIGS. 2 and 3.

Computer readable program instructions 504, 506, 508, and 510 described herein can be downloaded to respective computing/processing devices from a computer readable storage medium or to an external computer or external storage device via a network, for example, the Internet, a local area network, a wide area network and/or a wireless network. The computer program product 500 may include cloud-based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 504, 506, 508, and 510 from the network and forwards the computer readable program instructions for storage in a computer readable storage medium within the respective computing/processing device.

A sequence of program instructions or a logical assembly of one or more interrelated modules defined by the recorded program means 504, 506, 508, and 510, direct the system 100 and the EGFVI apparatus 200 for implementing enhanced cognitively guiding visually impaired users of the preferred embodiment.

While the present invention has been described with reference to the details of the embodiments of the invention shown in the drawing, these details are not intended to limit the scope of the invention as claimed in the appended claims.

What is claimed is:

1. A wireless system using Internet of Things (IoT) signals for implementing enhanced cognitively guiding visually impaired users comprising:
a 5G enabled guide for visually impaired (EGFVI) apparatus, situated in service orchestration layer of 5G network;
said EGFVI apparatus used to implement enhanced cognitively guiding visually impaired user comprising:
said EGFVI apparatus, receiving user information of source and destination for EGFVI service;
said EGFVI apparatus, using an EGFVI route map database including a physical layout including the source and destination for generating route maps for the EGFVI service;
said EGFVI apparatus, loading required data including traffic details, IoT enabled signals, non-IoT enabled signals;
said EGFVI apparatus, using the required data and providing an appropriate map including the source and destination based on identified Internet of Things (IoT) enabled signals;
said EGFVI apparatus, providing an optimal path having minimal obstacles;
said EGFVI apparatus, tracking a user travel in a boundary area;
said EGFVI apparatus, computing a dynamic boundary in the boundary area;
said EGFVI apparatus, identifying the IoT enabled signals in the boundary area; and
said EGFVI apparatus, triggering notification alerts in response to identifying one or more nearby mobile devices.

2. The system as recited in claim 1, wherein said EGFVI apparatus situated in service orchestration layer includes an EGFVI controller and an EGFVI agent, one said EGFVI agent provided with an end user, and one said EGFVI agent provided with a traffic device.

3. The system as recited in claim 2, wherein said EGFVI apparatus situated in service orchestration layer offered as a-service-model to subscribed users, said EGFVI controller uses a special route map component for enabling a visually impaired end user to select a route.

4. The system as recited in claim 3, wherein said EGFVI controller uses a route traffic light extractor for identifying IoT capable and 5G enabled lights in the route.

5. The system as recited in claim 3, wherein said EGFVI controller uses a route manager for sensing a user start of the route with a direction of travel and triggering control of an identified traffic light.

6. The system as recited in claim 2, includes said EGFVI agent with the traffic device providing audio specialized for visually impaired user.

7. The system as recited in claim 2, includes said EGFVI agent with the traffic device providing a special vision representation of traffic light color.

8. The system as recited in claim 1, includes said EGFVI apparatus confirming with a visually impaired end user to close a trip once done.

9. The system as recited in claim 1, includes said EGFVI apparatus notifying neighboring commuters that a visually challenged person is crossing a road.

10. The system as recited in claim 1, includes said EGFVI apparatus changing a color of a traffic light to symbolically specify a visually impaired end user crossing a road.

11. The system as recited in claim 1, includes control code stored on a non-transitory computer readable medium, and wherein said EGFVI apparatus uses said control code to implement cognitively guiding a visually impaired end user.

12. A computer-implemented method for implementing enhanced cognitively guiding visually impaired users in a 5G enabled guide for visually impaired (EGFVI) apparatus using Internet of Things (IoT) signals, said computer-implemented method comprising:
  receiving user information of source and destination for EGFVI service;
  using an EGFVI route map database including a physical layout including the source and destination for generating route maps for the EGFVI service;
  loading required data including traffic details, IoT enabled signals, non-IoT enabled signals;
  using the required data and providing an appropriate map including the source and destination based on identified Internet of Things (IoT) enabled signals;
  providing an optimal path having minimal obstacles;
  tracking a user travel in a boundary area;
  computing a dynamic boundary in the boundary area;
  identifying the IoT enabled signals in the boundary area; and
  triggering notification alerts in response to identifying one or more nearby mobile devices.

13. The computer-implemented method as recited in claim 12, wherein said EGFVI apparatus includes an EGFVI controller and an EGFVI agent, one said EGFVI agent provided with an end user, and one said EGFVI agent provided with a traffic device.

14. The computer-implemented method as recited in claim 13, includes using a special route map component of said EGFVI controller, enabling a visually impaired end user to select a route.

15. The computer-implemented method as recited in claim 14, includes identifying IoT capable lights in the route.

16. The computer-implemented method as recited in claim 14, includes sensing a user start of the route with direction of travel and triggering control of an identified traffic light.

17. The computer-implemented method as recited in claim 13, includes providing audio specialized for the visually impaired user with said EGFVI agent provided with the traffic device.

18. The computer-implemented method as recited in claim 13, includes providing a special vision representation of traffic light color for the visually impaired user with said EGFVI agent provided with the traffic device.

19. The computer-implemented method as recited in claim 12, includes changing a color of a traffic light to symbolically specify a visually impaired end user crossing a road.

20. The computer-implemented method as recited in claim 12, includes identifying in scope traffic lights and triggering in-scope traffic lights through location tracking mechanisms.

* * * * *